United States Patent [19]
Pollmeier

[11] 4,065,713
[45] Dec. 27, 1977

[54] VOLTAGE STABILIZER
[75] Inventor: Werner Pollmeier, Verl, Germany
[73] Assignee: Nixdorf Computer AG, Germany
[21] Appl. No.: 612,498
[22] Filed: Sept. 11, 1975
[30] Foreign Application Priority Data
  Sept. 13, 1974  Germany .......................... 2443893
  July 17, 1975  Germany .......................... 2532019
[51] Int. Cl.² .................................. H02M 3/335
[52] U.S. Cl. ................................. 363/19; 323/25;
                              323/DIG. 1; 363/23
[58] Field of Search ............. 321/2, 18; 323/17, 22 T,
                              323/DIG. 1, 25

[56] References Cited
U.S. PATENT DOCUMENTS

| | | | |
|---|---|---|---|
| 3,551,777 | 12/1970 | Bingley | 321/2 |
| 3,736,495 | 5/1973 | Calkin et al. | 323/DIG. 1 |
| 3,737,755 | 6/1973 | Calkin et al. | 321/2 |
| 3,818,306 | 6/1974 | Marini | 323/DIG. 1 |
| 3,969,652 | 7/1976 | Herzog | 321/2 X |

Primary Examiner—A. D. Pellinen
Attorney, Agent, or Firm—Gifford, Chandler, Sheridan & Sprinkle

[57] ABSTRACT

A voltage stabilizer includes the series combination of a series regulator element and inductor and an inverter circuit connected across a direct voltage supply. The series regulator is controlled by a comparator which compares the stabilized output voltage with a reference voltage. A diode energized in the forward direction by inductive turn-off voltage appearing on the inductor is connected in shunt with the series combination of inductor and inverter circuit. A series combination of a diode energized in the forward direction by the inductive turn-off voltages appearing on the inductor and the parallel combination of a resistor and a capacitor may be connected in shunt with the input of the inverter circuit. The inverter may be of the push-pull parallel or bridge type. The inverter output may be inductively coupled with the series control element.

8 Claims, 4 Drawing Figures

VOLTAGE STABILIZER

FIELD OF THE INVENTION

This invention relates to a circuit arrangement for providing a stabilized output direct voltage from an unstabilized input direct voltage provided at two output terminals of a direct current source, by making use of a series control element with a control path, conveniently formed by the collector/emitter path of a transistor, and an energy storage arrangement including inductance connected directly with the series control element, the series control element being connected with one output terminal and the energy storage arrangement with the other output terminal of the direct voltage source, the end of the inductance connected with the series control element being connected with the said other output terminal of the direct voltage source by way of a diode poled so that it is forward biased by turn-off voltages appearing across the said inductance, and the series control element being arranged to be periodically controlled by a drive circuit responsive to the difference between a reference voltage and the voltage appearing at the end of the inductance opposite to that which is connected with the series control element and with the diode.

DESCRIPTION OF THE PRIOR ART

A circuit arrangement of the kind set out above is already known from the German published Patent Specification As 1 049 962. In this known circuit arrangement the energy storage arrangement is formed by the series combination of an inductor and a capacitor, across which the output direct voltage may be derived. The drive circuit is then formed by a multivibrator circuit including two transistors. In this multivibrator there is applied to the bases of the two transistors as a control signal a voltage derived from the voltage on the capacitor, that is proportional to the difference between the instantaneous actual voltage and a reference voltage representing the desired output voltage. In this manner the duration of one half-wave of the output voltage of the multivibrator is appropriately altered. By way of a transformer connected to the collectors of the two transistors there is controlled an auxiliary transistor, which is coupled in a bistable trigger circuit with the series control element formed by a transistor. Apart from the fact that this known circuit arrangement is thus burdened with the disadvantage of a relatively high production cost, the use of this circuit arrangement may lead to difficulties, more particularly owing to damage to the semiconductor components resulting from the flow of very high currents, when a plurality of these circuit arrangements are used in parallel or when a short circuit appears in the output circuit supplied by such a circuit arrangement.

SUMMARY OF THE INVENTION

The object of the invention is to construct a circuit arrangement of the kind initially described in such a manner that its output circuit is protected against short circuits and so that if required a plurality of such circuit arrangements may be connected in parallel in a simple manner.

In an embodiment of the present invention a voltage stabilizer circuit arrangement comprises input terminals for the receipt of an unstabilized input direct voltage, a series combination including a series regulator element having a control input and a controlled path and an energy storage means including an inductance connected directly to the controlled path of the series regulator element, with said series regulator element connected to one said input terminal and said energy storage means connected to the other said input terminal, and the end of the inductance connected to the series regulator element also connected with the said other input terminal by way of a diode poled so as to be energized in the forward direction by the inductive turn-off voltage appearing on the inductance and a control circuit arranged to control the series regulator element in accordance with the difference between a predetermined reference voltage and the stabilized voltage, characterized by an inverter circuit having a direct current input and an alternating current output, with said direct current input being connected between the inductor of the energy storage circuit and said other input terminal, and said inverter circuit output connected by way of a rectifier circuit to provide a direct voltage output, means applying said direct voltage output to one input of a comparator means, means applying a predetermined reference voltage to the other input of said comparator means and means applying the output of said comparator to the control input of said series regulator element.

The use of the invention is accompanied by the advantage that by relatively simple circuit means the danger of damage to the semiconductor components, especially those in the drive circuit, through the appearance of uncontrolled short-circuit currents is avoided; the maximum current appearing, that can be applied to the inverter circuit, is in fact determined only by the relatively low instantaneous value of the current provided by the series control element and the inductance connected with this. The invention provides the additional advantage that similarly constructed circuit arrangements may be connected directly in parallel with one another.

According to an advantageous embodiment of the invention the inverter circuit is formed by a parallel/-push-pull voltage inverter with two transistors, of which the collector/emitter paths are connected in parallel by way of respective windings of a push-pull transformer. This provides the advantage of particularly low production cost of the apparatus.

According to another advantageous embodiment of the invention the inverter circuit is formed by a bridge inverter containing four transistors, in which pairs of transistors have their collector/emitter paths in series and in which the junction point between the collector/emitter paths of one pair of transistors is connected with the junction between the collector/emitter paths of the other pair of transistors by way of a winding of a transformer. This provides the advantage of a particularly reliably operating circuit arrangement.

According to yet another advantageous embodiment of the invention there is connected in parallel with the inverter circuit the series combination of a parallel RC element containing a resistor and a capacitor and a diode of such polarity that the diode passes current in response to the inductive turn-off voltages appearing on the inductance. In this manner the transistors of the drive circuit are protected from damage by uncontrolled turn-off voltages.

According to yet another advantageous embodiment of the invention the inverter is arranged so that its transistors are each turned on during mutually overlapping time intervals. In this manner also the advantage is produced, that damage to the transistors of the inverter through the inductive turn-off voltage appearing on the inductor during the turning off of the respective transistors is prevented.

According to yet another advantageous embodiment of the invention the output of the comparator is inductively coupled with the control input of the series control element. The advantage is thus obtained that the control input of the series control element is only accessible to a control signal in response to an alteration of the output direct voltage.

If, in a circuit arrangement in accordance with the invention, a parallel RC element is connected in parallel with the inverter circuit, then for certain modes of operation an undesirably high power loss may occur in the resistor of the RC element. In order to reduce this power loss, the circuit arrangement according to the invention may be modified in that there is connected in parallel with the circuit the series combination of a second diode acted upon in the forward direction by the inductive turn-off voltages of the inductance and a capacitor, and that there is connected in parallel with this second diode a circuit branch containing a choke coil and possibly a resistor.

It is thus possible substantially to reduce the power loss in the voltage limiter circuit. The choke coil effects a feedback of derived current over the second diode to the junction of the first inductance with the inverter circuit, so that a substantial reduction of the power lost in the resistance formed by it or connected in series with it is possible. With such a series combination the power loss is reduced to about 10% of the value normally appearing.

If the last-mentioned circuit branch contains only the choke coil, the circuit arrangement in accordance with the invention can also be constructed so that the diode is connected with the first capacitor by way of a second capacitor and that a resistor is connected in parallel with the second capacitor. The second capacitor then forms a series combination together with the first capacitor and the second diode. The circuit branch containing the choke coil is then connected to the series combination of the second diode and the further capacitor. The further capacitor effects a diminution of the voltage appearing upon the first capacitor, so that a reduction in size of the choke coil is possible. In addition, this circuit arrangement provides a low-impedance low power loss supply point at the junction of the choke coil with the first capacitor, for further circuit arrangements which may possibly be provided, through which currents from the energy storage arrangement connected thereto may be fed for the recovery of electrical energy. The resistor is here as lightly loaded as in the previously mentioned case of its being connected in series with the choke coil.

The herein described arrangements for reducing the power loss may be further improved by connecting in parallel with the inverter circuit the series combination of a diode acted upon in the forward direction by the inductive turn-off voltage of the inductance and a parallel RC circuit element. Through this improvement it is arranged that the choke coil may be of smaller dimensions; it is then possible to extend the voltage rise-time at the input of the inverter circuit connected to the inductance. This arrangement may be advantageous during the turning off of the circuit arrangement at the mains switch, since upon blocking the inverter circuit the residual energy of the inductance is taken to the current source from the capacitor of the RC element. The resistance of the parallel RC element can then be given such a high value that its power loss is negligible. The voltage risetime can be extended to values such that the choke coil need be designed only in accordance with the allowable maximum current of the drive circuit.

DESCRIPTION OF THE PREFERRED EMBODIMENTS

Figure 1:
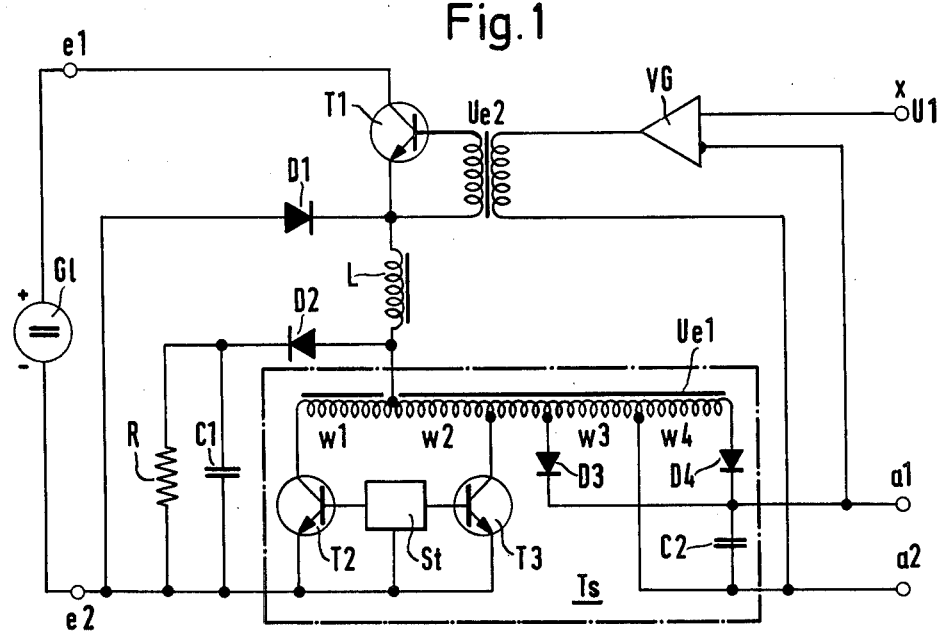
FIG. 1 shows the circuit diagram of an embodiment of circuit arrangement in accordance with the invention including a parallel push-pull inverter.

The circuit arrangement represented in FIG. 1 includes a direct voltage source G1 such as a rectifier circuit, providing an unstabilized input voltage between its two output terminals e1 and e2. To terminals e1, e2 is connected a series combination consisting of the collector/emitter path of a transistor T1 employed as a series control element, an inductor L and a parallel push-pull inverter forming an inverter circuit Ts and including two transistors T2 and T3, the collector/emitter paths of which are connected mutually in parallel by way of respective windings W1 and W2 of a push-pull transformer Ue1, which also possesses further windings W3, W4. All the transistors T1, T2, T3 are here of the same conductivity type, in fact of the npn type. To the bases of the transistors T2 and T3 in the inverter circuit Ts there is connected a control circuit St, indicated only schematically in FIG. 1; this control circuit St normally includes two mutually connected additional windings of the push-pull transformer Ue1. The free ends of the mutually connected windings are connected with the bases of the respective transistors T2, T3, and their mutually connected ends are connected, possibly by way of a resistor, to the output terminal e2 of the direct voltage source G1.

The cathode of a diode D1 is connected to the junction of the emitter of the transistor T1 with the inductance L formed by a choke coil. The anode of the diode D1 is connected with the output terminal e2 of the direct voltage source G1.

The anode of a diode D2 is connected with the junction of the choke coil L with the two windings W1, W2 of the push-pull transformer Ue1. The cathode of the diode D2 is likewise connected with the output terminal e2 of the direct voltage source G1 by way of a parallel RC combination including a resistor R and a capacitor C1.

The two windings W3 and W4 of the push-pull transformed Ue1 are connected by their free ends to the anodes of respective diodes D3 and D4. The cathodes of the two diodes D3 and D4 are connected in common to an output terminal a1. The mutually connected ends of the two windings W3 and W4 are connected directly to another output terminal a2. A capacitor C2, across which an output direct voltage may be taken, is connected between the two output terminals a1 and a2.

There is also connected to the output terminal a1 one input of a comparator VG having two inputs and one output. The other input of comparator VG is connected with an input terminal x. This input terminal x receives a predetermined reference potential U1, as will be further explained in what follows. The output of the comparator VG is connected with one end of a winding of a transformer Ue2, the other end of this winding being connected to the output terminal a2, which is most conveniently grounded. The transformer Ue2 has, in addition to the winding already mentioned, a further winding, which is connected in parallel with the base-emitter path of the transistor T1.

The circuit arrangement described above operates as follows. In response to unstabilized direct voltage of a direct voltage source G1 connected to the output terminals e1 and e2, a current flows from the collector to the emitter of the transistor T1 and also through the choke coil L to the parallel push-pull inverter. The inverter must operate in response to this flow of current. If necessary, starting means may be provided in the control circuit St for this purpose. In the operation of the inverter its transistors T2, T3 are each made alternately conductive and non conductive so that the current from the choke coil L flows alternately to the winding W1 of the push-pull transformer Ue1 and the collector/emitter path of the transistor T2, and through the winding W2 and the collector/emitter path of the transistor T3 to the output terminal e2 of the direct voltage source G1.

Because of the alternating current flows in the windings W1 and W2 of the push-pull transformer Ue1, voltages are induced in its windings W3, W4, which are rectified by means of the diodes D3, D4 and smoothed by means of the capacitor C2. Across the capacitor C2, and thus at the output terminals a1 and a2 there is available an output direct voltage, the magnitude of which depends in known manner upon the turns ratio of the windings W1, W2, W3 and W4. This output direct voltage is now compared, with the aid of the comparator VG, which may for example be a difference amplifier, with the predetermined reference voltage U1 applied to the input terminal x. The comparator VG provides at its output an output voltage proportional to the difference between the voltages which are compared by it, by means of which the state of conduction of the transistor T1 is appropriately controlled by way of the transformer Ue2. The transistor T1 is made conductive when the output direct voltage is smaller than the reference voltage U1. Thus a control voltage is formed through which it is ensured that the output direct voltage appearing at the output terminals a1, a2 is brought to and maintained at an exactly predetermined value; the output direct voltage is thus stabilized.

As already mentioned, the transistors T2, T3 of the inverter are alternately conductive and non conductive. On transition from the conductive condition into the non conductive condition, these transistors T2, T3 do not have mutually overlapping turn-on times so that a relatively high inductive turn-off voltage is formed on the choke coil L. In the present case, however, this turn-off voltage is limited by the series combination of the diode D2 and the parallel RC combination, comprising the resistor R and the capacitor C1, and in fact, to a value given by the voltage appearing on the parallel RC combination such that damage to the transistors T2 and T3 is prevented. The diode D1, of which the cathode is connected to the junction between the emitter of the transistor T1 and the end of the choke coil L, is energized in the forward direction upon the appearance of such an inductive turn-off voltage; it thus protects the transistor Ti from damage by that turn-off voltage.

In connection with the above it is mentioned that to protect the transistors T2, T3 of the inverter, it may also be so constructed that its transistors T2, T3 have mutually overlapping turn-on times. In this case the series combination, consisting of the diode D2 and the parallel RC combination containing the resistor R and the capacitor C1, is unnecessary.

If a short circuit appears between the output terminals a1 and a2, the inverter ceases to oscillate. The turn-off voltage then appearing on the choke-coil L is, as explained above, bled off over the diodes D1 and D2 so that the transistors T1, T2 and T3 are not damaged by this turn-off voltage. The transistors, and in particular the transistors T2 and T3 are moreover not damaged by the current which now flows. The series combination of the collector/emitter path of the transistor T1 and the choke-coil L, to be considered more or less as a current source, merely supplies a relatively small momentary current. Because of this characteristic of the series combination of the collector/emitter path of the transistor 1 and the choke coil L representing a controlled current source, the transistors T2, T3 of the inverter are also undamaged when the voltage inverter is again set in operation and the turn-on times of the two transistors T2, T3 operating as switches differ greatly from each other since the push-pull transformer Ue1 may go into saturation. Even when a number of circuit arrangements of the kind considered are connected in parallel to form a composite supply unit, no damage to the transistors of the circuit arrangement considered results as result of the flow of equalizing currents or short circuits between the individual circuit arrangements, in view of the characteristics of the series combination comprising the collector/emitter path of one of the transistors acting as series regulator and a choke coil. Finally, even a difference between the turn-on times of the transistors forming the various inverters will not lead to damaging currents being able to flow through the respective transistors.

Figure 2:
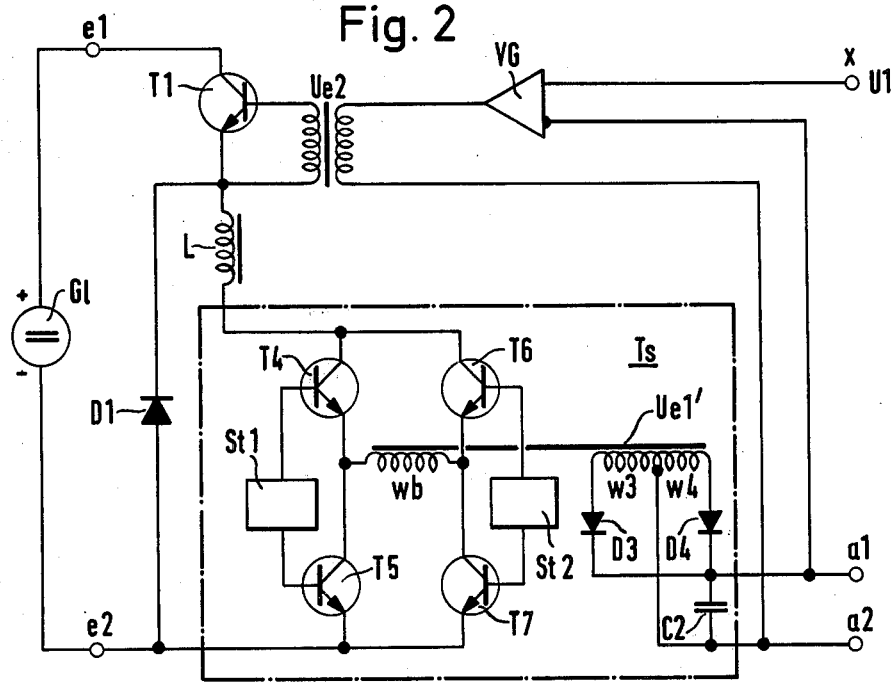
FIG. 2 shows another embodiment of the invention including a bridge inverter.

The circuit arrangement shown in FIG. 2 agrees generally with that represented in FIG. 1; it differs from the previous circuit arrangement substantially only in that instead of the push-pull parallel inverter of FIG. 1, there is here employed as the inverter circuit Ts a bridge inverter containing four transistors T4, T5, T6 and T7. In addition, the series combination of FIG. 1, consisting of the diode D2 and the parallel RC combination R, C1, is not represented in the circuit arrangement of FIG. 2, although this series combination may also be employed in the latter circuit. It is moreover remarked that with reference to the circuit components shown in FIG. 2, these agree with the circuit components shown in FIG. 1 and are therefore designated by the same reference characters as for the corresponding components of FIG. 1. Since the respective circuit components are also connected together in the same manner as in the circuit arrangement represented in FIG. 1, it is considered in the present case only necessary to consider the manner in which the circuit arrangement of FIG. 2 differs from that of FIG. 1.

The bridge inverter shown in FIG. 2 includes two pairs of transistors T4, T5, and T6, T7 having their collector/emitter paths connected in series. These transistors are of the npn conductivity type, as is the transistor T1. The junction point of the collector/emitter paths of the transistor pairs T4, T5 and T6, T7 are connected together by way of a winding Wb of a transformer Ue1'. This transformer Ue1' also includes the windings W3 and W4. The bases of the transistors T4, T5 and T6, T7 having their collector/emitter paths connected pair wise in series are each connected with a control circuit St1 and St2, each of which may also comprise a respective winding of the transformer Ue1'. These windings may then be connected in parallel with the base-emitter paths of the respective transistors T4, T5, T6 and T7, although this is not further represented in FIG. 2.

The circuit arrangement represented in FIG. 2 operates in principle in the same manner as the circuit arrangement shown in FIG. 1. Owing to the nature of the current source formed by the series combination of the collector/emitter path of the transistor T1 and the choke coil L, as well as the diodes connected with the choke coil L, here also appropriate protection of the transistors of the respective switching arrangements is obtained, as in the circuit arrangement shown in FIG. 1. A difference between the circuit arrangement of FIG. 1 and that shown in FIG. 2, is that in the latter circuit two transistors of the transistors T4 to T7 in the bridge inverter are conductive at any time. Accordingly, either the two transistors T4 and T7 are conductive, or the transistors T5 and T6. According to which pair of transistors T4, T7, and T5, T6 is conductive, a current flows in one or in the other direction through the winding Wb of the transformer Ue1', with the result that the corresponding voltages are induced in the windings W3, W4 which lead to the provision of an output direct voltage. This output direct voltage, as explained in connection with the circuit arrangement shown in FIG. 1, is compared by means of the comparator VG with a predetermined reference voltage U1 received at the input terminal x. The comparator VG then controls the transistor T1 in an appropriate manner, as has been explained in connection with the circuit arrangement of FIG. 1, so that the output direct voltage is stabilized at the required value.

Finally, it is remarked that as a modification of the arrangement shown in the drawing, it is also possible to apply a voltage derived from a separate winding on the transformer Ue1 or Ue1' of the voltage inverter by way of a rectifier circuit to one input of the respective comparator VG, which compares the respective voltage with the predetermined reference voltage U1.

Figure 3:
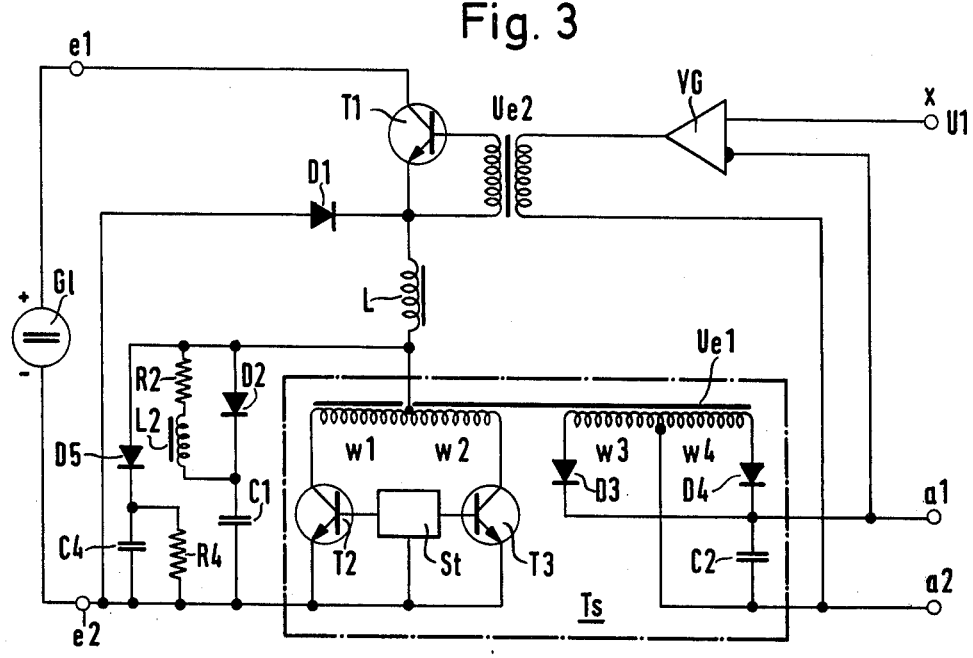
FIG. 3 shows a circuit arrangement in accordance with the invention in which the power loss in a smoothing circuit is reduced.

In FIG. 3 there is shown a modification of the circuit arrangement of FIG. 1. The same reference characters are employed in FIG. 3 for circuit elements already described with reference to FIG. 1, the difference is merely in the arrangements for voltage limiting which are connected to the junction between the inductance L and the tapping of the primary winding W1-W2 of the transformer Ue1. This tapping is connected by way of the series combination of a diode D2 and a capacitor C1 with the output terminal e2 of the direct voltage source G1, so that this series combination is bridged across the drive circuit Ts. In a circuit branch connected in parallel with the diode D2 there are provided a choke coil L2 and a resistor R2 connected in series. In this circuit arrangement, there results a feedback of the current derived at the tapping of the primary winding W1/W2 by way of the diode D2, over an inductor and a resistor, which resistor may in some cases be provided by the resistance of the choke coil itself. Since the choke coil affects the timing of the pulsatory current fed back through the diode D2, and smooths this current, the power loss may be reduced to about 10% of the value which would normally result with a simple RC combination.

In FIG. 3 there is shown a further current branch which is connected in parallel with an inverter circuit Ts, and contains an additional diode D5 in series with a parallel RC combination consisting of a capacitor C4 and a resistor R4. By means of this additional current branch it is possible to prolong the voltage rise time at the tapping of the primary winding W1/W2 of the transformer Ue1, which has a substantial effect upon the turn-off characteristics of the circuit arrangements. When both transistors T2 and T3 are turned-off, then the inductance L discharges to the capacitors C1 and C4. If the capacitor C4 is omitted, then a larger voltage impulse results because of the relatively small value of capacitor C1. A large capacitor C4 increases the time of this voltage rise and reduces the peak voltage. Since in order to produce such a prolongation, the value of the resistor R4 may also be chosen veryhigh, the power loss to which it gives rise is negligibly small. The additional provision of this circuit branch ensures that the inductance of the choke L2 need only be chosen by consideration of the maximum allowable current in the drive circuit, without taking into account the extended voltage rise time at the turn-off instance in the whole circuit.

Figure 4:
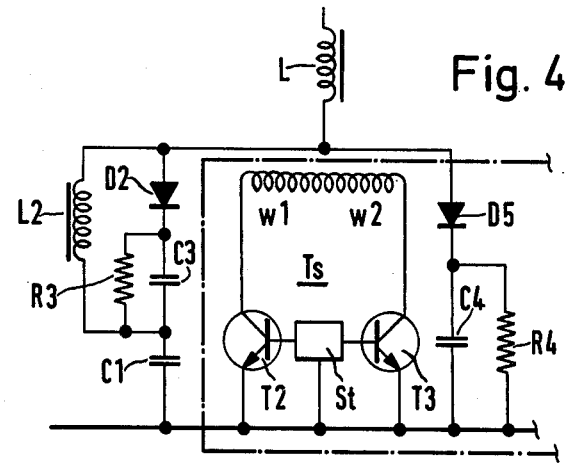
FIG. 4 shows an advantageous modification of the circuit arrangement described in relation to FIG. 3.

In FIG. 4 there is shown a further embodiment of the invention, with only the part of the whole circuit which is here of interest being shown. It will be seen that there is connected in parallel with the inverter circuit Ts a branch circuit which contains the series combination of the diode D2 and the capacitor C1, as well as a further capacitor C3, which is connected between the capacitor C1 and the diode D2. The series combination of diode D2 and capacitor C3 is connected in parallel with the choke coil 12, while the resistor R3 is connected only in shunt with the capacitor C3.

The additional capacitor C3 controls the voltage appearing on the capacitor C1 when current flows, since the two capacitors act as a voltage divider and the choke coil L2 is connected to their junction. A reduction of the inductance of the choke coil L2 may thus likewise be achieved. The power loss appearing in the resistor R3 corresponds to the value which could be obtained for the previously described embodiment. The additional branch shown in FIG. 4, including the diode D5, the resistor R4 and the capacitor C4, can obviously also be provided here.

What we claim is:

1. A voltage stabilizer circuit arrangement comprising input terminals for the receipt of an unstabilized input direct voltage, a series combination including a series regulator element having a control input and an energy storage means including an inductance connected directly to the controlled path of the series regulator element, with said series regulator element connected to one said input terminal and said energy storage means connected to the other said input terminal, and the end of the inductance connected to the series regulator element also connected with the said other input terminal by way of a diode poled so as to be energized in the forward direction by the inductive turn-off voltage appearing on the inductance, and a control circuit arranged to control the series regulator element in accordance with the difference between a predetermined reference voltage and the stabilized voltage,, characterized by an inverter circuit (Ts) having a direct current input and an alternating current output, with said direct current input being connected between the inductor (L) of the energy storage circuit and said other input terminal (e2), and said inverter circuit output connected by way of a rectifier circuit (D3, D4) to provide a direct voltage output, means applying said direct voltage output to one input of a comparator means (VG), means applying a predetermined reference voltage to the other input of said comparator means, and means (Ue2) applying the output of said comparator to the control input of said series regulator element wherein there is connected in parallel with the inverter circuit input a series combination of a diode (D2) and the parallel RC combination of a resistor (R) and a capacitor (C1), said diode having a polarity such that it is energized in the forward direction by the inductive turn-off voltages appearing on the inductance.

2. A circuit arrangement as claimed in claim 1 wherein said inverter circuit is formed by a bridge inverter including four transistors (T4-T7), pairs of said transistors having their collector/emitter paths connected in series and the junction between the collector/emitter paths of one said pair of transistors being connected with the junction between the collector/emitter paths of the other said pair of transistors by way of a winding (Wb) of a transformer (Ue1).

3. A circuit arrangement as claimed in claim 1 wherein the transistors T2 and T3 are turned on during mutually overlapping time intervals.

4. A circuit arrangement as claimed in claim 1, wherein the output of the said comparator is inductively coupled with the control input of the said series regulator element.

5. A circuit arrangement as defined in claim 1, wherein the inverter circuit is formed by a parallel push-pull inverter including two transistors (T2, T3) the collector/emitter paths of which are connected in parallel with each other by way of a respective winding of a push-pull transformer (Ue1).

6. A voltage stabilizer circuit arrangement comprising the series combination of a series regulator element, an inductance and an inverter circuit arranged to be connected to an unstabilized direct voltage source, the combination of said inductance and said inverter circuit being bridged by a diode energized in the forward direction by inductive turn-off voltages appearing on said inductance, the inverter circuit providing the stabilized direct voltage output by way of a rectifier circuit, and the series regulator being controlled by the output of a comparator circuit arranged to compare the said stabilized output voltage with a reference voltage, characterized by the series combination of a further diode (D2) energized in the forward direction by inductive turn-off voltages appearing on said inductor (L) and a capacitor (C1) connected in parallel with the inverter circuit, and a branch circuit including the series combination of inductance and resistance connected in shunt with said further diode (D2).

7. A circuit arrangement in accordance with claim 6, wherein there is connected in parallel with the inverter circuit the series combination of a diode (D2) energized in the forward direction by inductive turn-off voltages of said inductance (L) and the parallel combination of a resistor (R) and a capacitor (C1).

8. A voltage stabilizer circuit arrangement comprising the series combination of a series regulator element, an inductance and an inverter circuit arranged to be connected to an unstabilized direct voltage source, the combination of said inductance and said inverter circuit being bridged by a diode energized in the forward direction by inductive turn-off voltages appearing on said inductance, the inverter circuit providing the stabilized direct voltage output by way of a rectifier circuit, and the series regulator being controlled by the output of a comparator circuit arranged to compare the said stabilized output voltage with a reference voltage, characterized by the series combination of a further diode (D2) energized in the forward direction by inductive turn-off voltages appearing on said inductor (L), a further capacitor (C3) and resistor (R3) parallel combination and a capacitor (C1) connected in parallel with the inverter circuit, and a branch circuit including an inductance (L2) connected in shunt with the series combination of the further diode (D2) and the capacitor (C3) and resistor (R3) parallel combination.

* * * * *

UNITED STATES PATENT AND TRADEMARK OFFICE
CERTIFICATE OF CORRECTION

PATENT NO. : 4,065,713

DATED : December 27, 1977

INVENTOR(S) : Werner Pollmeier

It is certified that error appears in the above-identified patent and that said Letters Patent are hereby corrected as shown below:

Col. 4, line 61, delete "formed" and insert -- former --.

Col. 6, line 3, delete "Ti", insert --T1--.

Col. 8, line 38, delete "12", insert --L2--.

Signed and Sealed this

Twenty-seventh Day of June 1978

[SEAL]

Attest:

RUTH C. MASON
Attesting Officer

DONALD W. BANNER
Commissioner of Patents and Trademarks